(12) United States Patent
Hampe et al.

(10) Patent No.: US 10,068,719 B2
(45) Date of Patent: Sep. 4, 2018

(54) SAFETY MAT FOR SAFEGUARDING A TECHNICAL INSTALLATION

(71) Applicant: Pilz GmbH & Co. KG, Ostfildern (DE)

(72) Inventors: Tobias Hampe, Ostfildern (DE); Joachim Rink, Ostfildern (DE); Matthias Kuczera, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 23 days.

(21) Appl. No.: 15/335,946

(22) Filed: Oct. 27, 2016

(65) Prior Publication Data
US 2017/0148583 A1 May 25, 2017

(30) Foreign Application Priority Data
Nov. 25, 2015 (DE) .......................... 10 2015 120 371

(51) Int. Cl.
*G01R 27/08* (2006.01)
*H01H 3/14* (2006.01)
(Continued)

(52) U.S. Cl.
CPC ............... *H01H 3/141* (2013.01); *F16P 3/12* (2013.01); *G01L 1/205* (2013.01); *H01C 10/10* (2013.01);
(Continued)

(58) Field of Classification Search
CPC .. G01D 5/16; H01H 1/06; H01H 3/14; H01H 3/141; H01H 2203/008; H01H 2003/147;
(Continued)

(56) References Cited

U.S. PATENT DOCUMENTS

| 5,602,428 A | 2/1997 | Schultz et al. |
| 5,798,703 A * | 8/1998 | Sakai ........................ F16P 3/12 307/119 |

(Continued)

FOREIGN PATENT DOCUMENTS

| DE | 196 04 128 C1 | 8/1997 |
| DE | 100 46 974 A1 | 10/2001 |

(Continued)

OTHER PUBLICATIONS

DIN EN 61076-2-104; Connectors for electronic equipment—Product requirements—Part 2-104: Circular connectors—Detail specification for circular connectors with M8 screw-locking or snap-locking (IEC 48B/2305/CD:2012); Sep. 2012; 65 pp.

(Continued)

*Primary Examiner* — Thang Le
(74) *Attorney, Agent, or Firm* — Harness, Dickey & Pierce, P.L.C.

(57) ABSTRACT

Safety mat for safeguarding an electrically driven installation, comprising a sensor, a rigid supporting body and an evaluation unit. The supporting body has a top side, a rear side and first and second side faces, adjoining the top and rear sides. The sensor has an active surface covering the top side of the supporting body. The rear side has an opening for contacting an evaluation unit arranged in the interior of the supporting body that is configured to provide an output signal depending on the actuation of the sensor. The first side face has a first cavity and the second side face has a second cavity. The rear side has a first and a second cable guide. The first cable guide connects the opening to the first cavity and the second cable guide connects the opening to the second cavity.

16 Claims, 9 Drawing Sheets

(51) Int. Cl.
*F16P 3/12* (2006.01)
*G01L 1/20* (2006.01)
*H01C 10/10* (2006.01)
*H01R 13/04* (2006.01)
*H01R 13/10* (2006.01)
*H02G 9/02* (2006.01)

(52) U.S. Cl.
CPC ............. *H01R 13/04* (2013.01); *H01R 13/10* (2013.01); *H02G 9/025* (2013.01); *H01H 2003/147* (2013.01); *H01H 2003/148* (2013.01)

(58) Field of Classification Search
CPC ......... H01H 2003/148; H03K 17/9645; H02G 9/025; H01R 13/04; H01R 13/10; F16P 3/12; G05B 19/0425; G08B 13/10; G08B 21/22
See application file for complete search history.

(56) References Cited

U.S. PATENT DOCUMENTS

| | | | | |
|---|---|---|---|---|
| 7,413,374 | B2* | 8/2008 | Rogers | E01C 9/086 404/35 |
| 2004/0253861 | A1* | 12/2004 | Schubert | H01H 3/141 439/206 |
| 2005/0075545 | A1* | 4/2005 | Honda | A61B 1/00039 600/301 |
| 2006/0082465 | A1* | 4/2006 | Grzan | H01H 3/141 340/665 |
| 2006/0175184 | A1 | 8/2006 | Grzan | |
| 2009/0065344 | A1* | 3/2009 | Pehrson | H01H 3/141 200/514 |
| 2011/0279276 | A1* | 11/2011 | Newham | A61B 5/1115 340/573.4 |
| 2011/0304383 | A1 | 12/2011 | Milon et al. | |
| 2012/0139719 | A1* | 6/2012 | Garcia | F24C 7/08 340/538 |

FOREIGN PATENT DOCUMENTS

| | | |
|---|---|---|
| DE | 100 46 974 B4 | 1/2005 |
| FR | 2 941 784 | 8/2010 |
| GB | 2 248 723 A | 4/1992 |
| WO | 2006/083997 A2 | 8/2006 |

OTHER PUBLICATIONS

DIN EN ISO 13856-1; Safety of machinery—Pressure-sensitive protective devices—Part 1: General principles for the design and testing of pressure-sensitive mats and pressure-sensitive floors; Aug. 2013; 60 pp.
European Search Report dated May 8, 2017; 5 pp.

* cited by examiner

SAFETY MAT FOR SAFEGUARDING A TECHNICAL INSTALLATION

CROSS-REFERENCES TO RELATED APPLICATIONS

This application claims priority from German patent application DE 10 2015 120 371.5, filed Nov. 25, 2015. The entire content of this priority application is incorporated herein by reference.

BACKGROUND OF THE INVENTION

The present disclosure relates to a safety mat for safeguarding a technical installation As automation of production processes has increased, the requirements for reliable safety of industrial production installations have continuously increased. For example, revised EC Machinery Directive of 17 May 2006 describes a standard safety level for preventing accidents which is to be taken into consideration when a machine is placed on the market or put into service. Accordingly, technical installations, machines and robots may be commissioned only in conjunction with corresponding safety measures. These measures include, in particular, monitoring hazardous regions of a technical installation and moving the technical installation to a state which is safe for persons and objects in the event of (un)authorized access to the hazardous region.

So-called pressure or switching mats, as are described in DE 100 46 974 B4 for example, are known from the prior art for identifying the presence of persons. Safety mats of this kind are generally composed of two current-carrying plates which are separated from one another and which are held at a distance from one another by strip- or grid-like spacers. If a person steps on the safety mat, the plates and spacers deform until a cross-connection is formed between the plates. The cross-connection can be detected by measurement and causes a connected safety relay module to switch off the technical installation or to prevent the said technical installation from starting up. The general principles and requirements made in respect of design and testing of pressure-sensitive safety devices of this kind are defined in EN ISO 13856-1. In particular, the minimum safety requirements in respect of performance, marking and documentation are specified in the standard.

The abovementioned safety mats have the disadvantage that only a specific surface area section in front of a machine can be monitored and therefore safety mats can be used only in defined access regions or defined operator positions, while further access to the machine has to be prevented by other safety devices or structural measures. Particularly in the case of modern installations, such as robots which operate in an automated manner, are free-standing and have to be accessible from all sides for example, it is not possible to limit access to specific access regions. It is therefore desirable to be able to protect the entire region around the technical installation by a pressure-sensitive safety device which is arranged on the floor.

However, the safety mats mentioned in the introductory part cannot perform this either as individual safety mats or as a composite comprising several safety mats. The effective surface area of an individual safety mat is determined and therefore limited by the respective plate size. Similarly, for structural reasons, the sensitivity is not homogeneous over the surface area of the safety mat, as indicated in DE 10 46 974 B4, and therefore identification is only limited or not possible at all in the boundary regions in particular. In a composite, this results in large regions, in which reliable detection cannot be ensured, being formed at the transitions between the safety mats by boundary regions meeting one another.

SUMMARY OF THE INVENTION

It is an object of the present invention to provide a safety mat which avoids the abovementioned disadvantages. In particular, it is an object to provide a safety mat which can be extended, in particular in a modular manner. Yet it is a further object to provide a safety mat that allows reliable identification even in the transition regions between two adjacent safety mats.

According to one aspect of the present disclosure there is provided a safety mat for safeguarding an electrically driven installation, comprising a sensor, a rigid supporting body and an evaluation unit, wherein the supporting body has a top side, a rear side and a first and a second side face, side faces adjoining the top side and the rear side, wherein the evaluation unit is arranged in the interior of the supporting body and is designed to provide an output signal depending on the actuation of the sensor, wherein the sensor has an active surface which covers the top side of the supporting body, wherein the rear side has an opening for contacting the evaluation unit in the interior of the supporting body, wherein the first side face has a first cavity and the second side face has a second cavity, and wherein the rear side has a first and a second cable guide and the first cable guide connects the opening to the first cavity and the second cable guide connects the opening to the second cavity.

It is therefore an idea to separate the sensor system and the housing structure of a safety mat from one another. This has the advantage that the effective surface area of the safety mat is dependent on the arrangement of the sensor on the housing and not on the housing itself. Therefore, the sensor is not dependent on the structure of the housing either and can be designed in any desired manner. A flexible, tactile sensor which is arranged on the supporting body is advantageously used, so that the active sensor area substantially completely covers a surface of the supporting body. The active sensor area is the area of the sensor which is touch-sensitive in order to detect a mechanical load. The active sensor area is also called the effective operating area of the sensor.

Separating the sensor and the housing further has the advantage that the supporting body can be of rigid and robust design since the supporting body itself does not contribute to the functioning of the sensor, but rather merely provides a support for the said sensor. A rigid design of the supporting body can advantageously ensure homogeneous sensitivity over the entire effective area, as a result of which the reliability of identification is increased. In addition, due to its rigid supporting body, the safety mat can advantageously be used in regions with a soft or uneven floor since these uneven areas with respect to the sensor are compensated for by the rigid supporting body, without influencing the sensitivity of the safety mat. In this connection, rigid means that the supporting body has a homogeneous strength and can withstand a pressure loading perpendicular to the top side of at least 800 N/cm$^2$. The rigid supporting body can be single part or multipartite, so that a supporting body is also of rigid design within the meaning of the invention when said supporting body is manufactured from a composite comprising a steel plate and an elastic component, for example a polyurethane substrate. The additional elastic component of the supporting body advantageously allows the supporting body to be matched to smaller uneven areas on the floor.

The evaluation unit is a signal-processing unit which is connected to the sensor and which is designed to evaluate a mechanical load on the sensor and to provide an output signal depending on the evaluation. Owing to the arrangement of the evaluation unit in the interior of the rigid supporting body, said evaluation unit is particularly well protected against the mechanical loads when the safety mat is stepped on. In addition, making contact with a sensor, which is generally complicated, by way of a large number of individual sensor cells can advantageously take place in the interior of the safety mat.

The output signal is advantageously provided via an opening in the rear side of the safety mat and by cable guides which start at the opening and connect the opening to cavities in the side faces of the supporting body. An output signal can therefore be guided to the outside in a simple manner when the safety mat is of compact construction. In particular, individual safety mats can advantageously be put together to form a composite with a continuous effective operating area, wherein the safety mats can be electrically interconnected entirely beneath the effective operating area. Contact can advantageously be made with different side faces by the first and the second cable guide selectively, so that, when the safety mats are interconnected, said safety mats are not fixed in respect of a specific orientation.

Designing the safety mat as a module allows the safety mats, like tiles, to be combined to form a composite, wherein a surface can advantageously be filled (parqueted) without gaps. Owing to the variable connection of the evaluation unit by different cable guides, a composite comprising safety mats can be easily changed or extended in order to match the composite to a monitoring region of a technical installation. Therefore, the abovementioned object is fully achieved.

In a preferred refinement, the rear side defines a planar level and the first and the second cable guide are recessed in the rear side. This refinement has the advantage that the safety mat can be laid flat and flush on a flat substrate. The rear side is substantially a smooth face in which the cable guides are recessed such that connection components which can be laid in the cable guides do not protrude beyond the planar level. A mechanical force which acts on the safety mat from the top side is therefore guided around components which are inserted into the cable guides. Components in the cable guides, for example a cable loom or cable harness, are therefore protected firstly against access and secondly against mechanical loading after the safety mat is laid out.

In a further refinement, the first and the second cable guide are channel-like, elongate recesses in the rear side of the supporting body with a defined length and a defined width. This refinement has the advantage that a connection component for the evaluation unit, such as a cable or a cable harness for example, can be laid particularly easily with a defined profile. The defined profile allows ordered and therefore safe laying of connection components. The defined length and width are advantageously selected such that they correspond to the length and width of a connection component. Furthermore, the channel-like recesses can be created in a simple manner as early as during production of the supporting body, for example directly during injection-moulding of the supporting body. No additional holders are required for the connection components.

In a particularly preferred refinement, the defined length of the first cable guide is equal to the defined length of the second cable guide. This refinement has the advantage that a connection component of equal length can be used independently of the side faces to which the cable guides lead. This is particularly advantageous when, for structural reasons, the opening is not arranged centrally in the rear side but rather closer to one of the two side faces to which the cable guides lead. A connection component with a defined length can therefore be laid in an orderly and safe manner both in the first and the second cable guide in the same way.

In a particularly preferred refinement, the first cable guide has a first section and a second section, wherein the defined width is constant in the first section and the defined width varies over the length of the section in the second section. This refinement has the advantage that a defined compression space in the cable guides is created in the second section. A compression space allows a connection component to be laid with play at this point, whereas the connection component is guided without play in the other sections. Therefore, in particular relatively small deviations in the length of the connection component, as can occur when connection components of adjacent safety mats are connected, can be compensated for in a controlled manner. The second section is preferably divided into a first region with a uniformly increasing width and into a second region with a uniformly decreasing width. The compression space is therefore the result of a uniform, preferably continuous, widening of the otherwise constant width of a cable guide. A respective first section, in which a connection component can be inserted without play, particularly preferably adjoins the two sides of the second section, so that the connection component is fixed securely in the compression space on two sides.

In a particularly preferred refinement, the channel-like, elongate recesses have a barrel-like profile in cross section in width. This refinement has the advantage that the recesses are particularly well-suited to holding a connection component securely in the cable guide. Owing to the barrel-like profile, the recesses have curved side walls, flush against which a connection component, in particular a round cable, can be placed. The barrel-like profile therefore prevents a connection component from slipping out of the cable guide.

In a further refinement, the first and the second cable guide are configured such that the first cable guide connects the opening and the first cavity without any kinks and the second cable guide connects the opening and the second cavity without any kinks. This refinement has the advantage that a connection component does not have to be laid around an edge in the cable guides. The kink-free profile of the cable guide therefore allows connection components which exhibit a low degree of flexibility and have a defined preferred direction in which they extend, such as sheathed screened cables or cable looms, to be laid.

In a further refinement, the first and the second cable guide have a curved profile with a varying curvature. This refinement has the advantage that the cable guides are configured without any kinks, in order to allow a simple cable guide. Furthermore, the curved profile means a defined length of the cable guide can be achieved independently of the position of the opening or of the cavities. Therefore, an identical defined length for different cable guides can be made possible even when the sections between the cavities in the side faces and the opening are not the same.

In a further refinement, the first cable guide has a curved profile with at least one straight section and with at least one transition bend. This refinement has the advantage that the curved profile becomes narrower in a bend only slowly and not suddenly, so that a connection component which exhibits a low degree of flexibility can also fit smoothly in the cable guide. Here, a transition bend is a connecting element which is arranged between a straight portion and an arc, between two arcs or between two straight portions which are at an angle in relation to one another. In contrast to a straight portion or an arc, a transition bend has varying radii of curvature and allows smooth transition between two sections. Two adjacent sections of the curved profile are always tangentially constant in relation to one another.

In a further refinement, the first cable guide and the second cable guide have at least one common section in the region of the opening. This refinement has the advantage that the cable guides lie together in the region of the opening, so that a connection component with a defined preferred direction can exit from the opening and opens into both cable guides. A connection component which is fixedly connected to the opening and protrudes out of said opening in a preferred direction can therefore be selectively inserted into one of the two cable guides. In this way, a connection component which is fixed in the opening is advantageously subjected to only slight mechanical loading when the connection component is moved from one to the other cable guide. Therefore, the opening can be closed and sealed without particular precautions, in order to ensure a high international protection marking, for example in line with IP67, for the safety mat. At the same time, a composite of safety mats can be interconnected in a flexible manner.

In a further refinement, contact is made with the evaluation unit by a cable which is fixed in the opening and which exits from the supporting body with a defined cable length. In this refinement, the evaluation unit is connected to a cable as the connection component. The cable is preferably a multicore, screened and sheathed cable for transmitting the output signal or for receiving control or other input signals or a supply voltage. The cable exits from the supporting body with a defined length, that is to say it is fixed in the opening, so that it cannot either be inserted further into the opening or be withdrawn from the opening. The connection component for the evaluation unit is therefore fixedly connected to the safety mat, so that the supporting body can be completely closed and sealed in order to ensure a high international protection marking.

In a particularly preferred refinement, the cable has a plug connector and the rear side has a first hollow and a second hollow as receptacles for the plug connector. This refinement has the advantage that contact can be made with the evaluation unit in a simple manner by a plug connector which itself can be integrated into the rear side. The first and the second hollow are matched to the external shape of the plug connector, so that the plug connector can be inserted into the first and the second recess in an interlocking manner. The hollow and the plug connector are preferably designed such that the plug connector can be clipped into the hollow and fixed, so that the plug connector is recessed in the rear side after being inserted into the first or the second hollow. The plug connector can furthermore be discretely or freely movable in the axial direction.

In a particularly preferred refinement, the first hollow is arranged at the end of the first cable guide and opens in the first cavity and the second hollow is arranged at the end of the second cable guide and opens in the second cavity. The hollows for the plug connector form the termination of the cable guides. An edge, on which the plug connector rests and is kept out of the cable guide, is preferably arranged at the transition from the cable guides to the hollow. Therefore, a connection component is advantageously situated in the cable guide in a manner not subjected to tensile stresses.

In a particularly preferred refinement, the first hollow and the second hollow intersect at an angle, preferably at a right angle. This refinement has the advantage that the hollows lie close to one another and therefore can be arranged at a similar distance from the opening. The intersection angle of the hollows corresponds to the angle at which the associated side faces intersect. In this way, the cavities in the side faces are advantageously arranged at the corners of the safety mat. The cavities are preferably arranged at the same distance from the intersection edge of the side surfaces, as a result of which combination of individual safety mats to form a composite is further simplified.

In a particularly preferred refinement, the plug connector has a connection side and the first hollow and the second hollow are configured such that the plug connector can be inserted into the first hollow in a first position and in a second position, wherein the connection side of the plug connector terminates flush with the side face in the first position and the connection side of the plug connector is not arranged flush with respect to the side face in the second position. This refinement has the advantage that the plug connector can be held in the hollows in different positions, as a result of which connection of adjacent safety mats to form a composite is simplified. A plug connector can therefore protrude beyond the side faces in order to make contact with the plug of an adjacent safety mat. In this way, safety mats can advantageously be interconnected in a simple and flexible manner.

It goes without saying that the abovementioned features and those still to be explained below can be used not only in the respectively indicated combination but also in other combinations or on their own without departing from the scope of the present invention.

DESCRIPTION OF PREFERRED EMBODIMENTS

Figure 1:
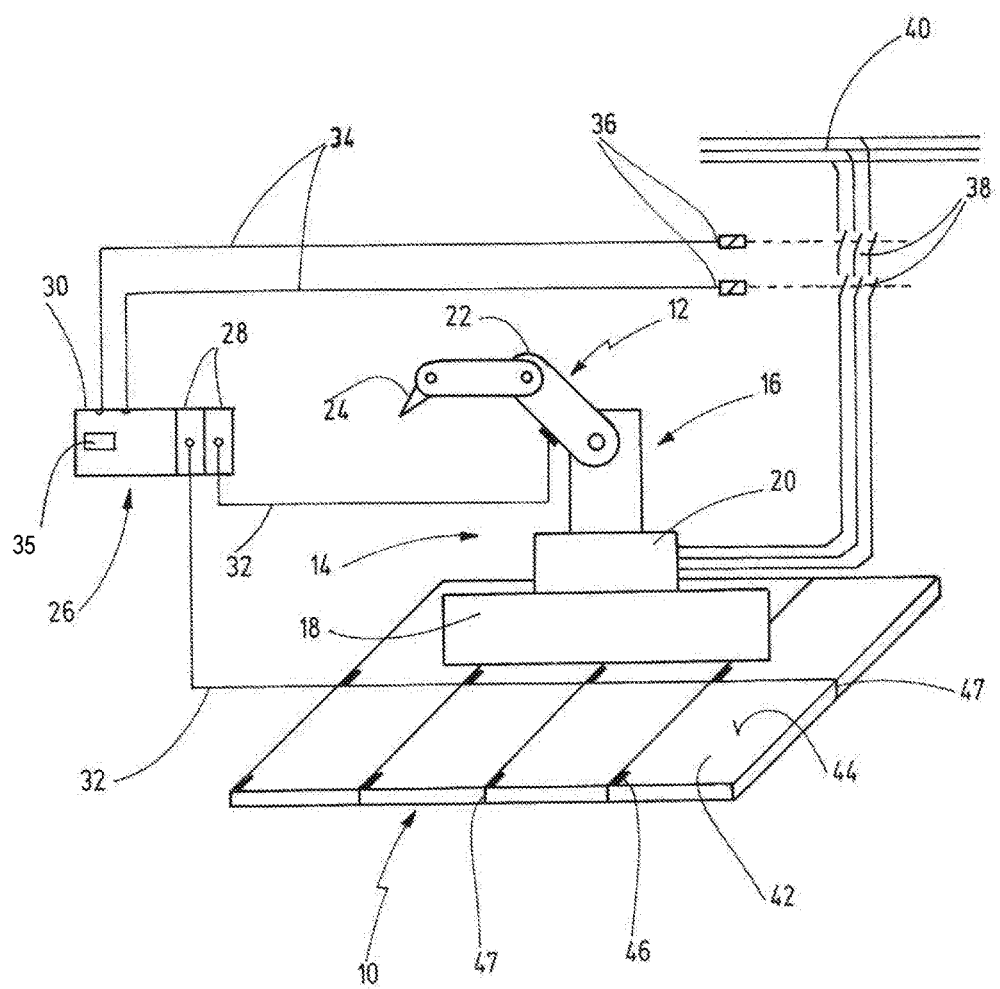
FIG. 1 is a schematic illustration of possible fields of application of exemplary embodiments of the novel safety device.

In FIG. 1, a first pressure-sensitive safety device and a second pressure-sensitive safety device are identified overall by reference numerals 10 and 12. The first and the second pressure-sensitive safety device serve to protect a technical installation 14 which is specified here as a robot 16 which operates in an automated manner. The robot 16 may be, for example, a cutting or welding robot in a production or assembly line.

The robot 16 is mounted on a holder 18 and can be rotated about its own axis by a drive 20. Furthermore, the robot 16 has a robot arm 22 which has a tool 24 at its end. The rotation and pivot region of the robot arm 22 defines an action region of the robot 16, which at the same time corresponds to a hazardous region of the robot 16. Entry into this region—both unauthorized and authorized—has to be identified so that the robot can be moved to a state which is not hazardous to persons. Here, the identification process is performed by the pressure-sensitive safety devices 10 and 12 which are coupled to a safety system 26. The safety system 26 can be an output signal switching device within the meaning of EN ISO 13856-1, for example a simple safety switching device, a configurable safety controller or else a programmable control unit. The safety system 26 is configured to move the technical installation 14 into a state which is not hazardous to persons, for example by the technical installation being switched off.

FIG. 1 shows a modular safety system 26 which has input modules 28 and an output module 30. The input modules 28 are coupled to the pressure-sensitive safety devices 10, 12 via lines 32. In the present exemplary embodiment, the output module 30 is connected to contactors 36 via a redundant line 34, the operating contacts 38 of the said contactors 36 being arranged in a power supply 40 of the electric drive 20. A processing unit 35 drives the contactor 36, in order to switch off the robot 16 in the event of a hazard, depending on the signals from the pressure-sensitive safety devices 10, 12, which are applied to the input modules 28. It goes without saying that switching off the technical installation 14 is only one possible option of moving the technical installation to a safe state. As an alternative or in addition, in another exemplary embodiment, the safety system 26 can also influence control of the movement of the robot 16 in order to establish a safe state, for example by having the robot 16 retract the robot arm 22. Further, it is likewise feasible for the processing unit 4235 to take into account the combined signals from the first pressure-sensitive safety device 10 and the second pressure-sensitive safety device 12 or any further safety devices in order to make a decision about how to drive the robot 16 based on joint consideration. Further safety devices can be, for example, non-contact safety devices (BWS) such as light barriers or light grids, or else a safety camera system.

In the exemplary embodiment according to FIG. 1, the first pressure-sensitive safety device 10 is a safety mat, in particular a switching mat within the meaning of EN ISO 13856-1, which is laid on the floor around the holder 18 of the robot 16. In this exemplary embodiment, the safety mat is modular and comprises eight safety mat modules 42 forming two rows each comprising four modules. Each safety mat module 42 comprises a sensor with an active sensor area 44 and an evaluation unit 46. The active sensor area 44 is pressure-sensitive, as will be explained in greater detail with reference to the following figures. The evaluation unit 46 is configured to register a load on the pressure-sensitive active sensor area 44 and to provide an output signal depending on the said load. The evaluation unit 46 can be a digital or analog circuit, a microcontroller, a FPGA, an ASIC or any other signal-processing unit.

In this exemplary embodiment, the output signal from the evaluation unit 46 is a signal which can indicate a first state and a second state. A safe state is preferably indicated by an active output signal (always on). Particularly preferably, the output signal is an OSSD signal, i.e. a redundant signal with two clock signals which are not synchronized with one another. The output signals from the individual evaluation units 46 can be transmitted individually or in a combined manner to the input module 28 of the safety system 26 via the line 32. If there is no output signal at all or the output signal does not reach the input module 28 in the expected form, the above-described safety function is executed by the safety system 26 and the technical installation 14 is switched off by the contactor 36.

The safety mat which is composed of the individual safety mat modules 42 comprises a substantially continuous sensor surface which is formed from the individual active sensor areas 44 of the safety mat modules 42. In this regard, substantially continuous means that safety-relevant identification can also take place in the transition regions of adjacent safety mats and the passive boundary regions are correspondingly minimized. In the exemplary embodiment according to FIG. 1, a safety mat module 42 has a cuboidal supporting body with an extended base. The base has a top side and rear side which have a large surface area in comparison to the side faces. The active sensor area 44 of the safety mat modules 42 completely covers the top side of the base. The effective operating area of the safety mat module therefore extends virtually over the entire surface of the safety mat module 42. In a combination of a plurality of safety mat modules, the effective operating area extends as far as the butt joints 47 between two adjacent safety mat modules 42, in order to form a virtually seamless operating area of the safety mat. In one exemplary embodiment, the supporting body additionally has a narrow border which surrounds the base to fasten a further protective layer onto this border in order to achieve a particularly high International Protection Marking (IP67).

In order to identify actuation of the safety mat, the evaluation units 46 of the individual safety mat modules 42 are also combined to a compound. This preferably takes place beneath the active sensor areas 44 in the interior of the safety mat modules 42 or on the rear side of the said safety mat modules. In one exemplary embodiment, the evaluation units 46 are connected in series, wherein the first or last evaluation unit 46 of the chain is connected to the input module of a safety system. The series circuit is designed such that, as soon as there is no output signal from an evaluation unit 46, an actuation of the entire safety mat is signalled to a safety system connected thereto. However, in other exemplary embodiments, a different combination of the individual evaluation units 46, for example a master and slave composition, and also different signal processing are feasible. Therefore, in one exemplary embodiment, the detected values may be directly passed on by the individual evaluation units 46 to the safety system which independently decides how the actuation of a safety mat module is to be assessed.

In the exemplary embodiment according to FIG. 1, the technical installation 14 is arranged on the safety mat and the effective surface. In other preferred exemplary embodiments, the safety mat is arranged around the holder 18 of the technical installation 14. If the installation is positioned on the effective surface, the safety mat or the individual safety mat modules have to be configured such that a region on which the technical installation 14 is positioned can be blanked out. In other words, the safety mat has to be of spatially resolving design in order to identify which regions of the active sensor area have been actuated. By means of the spatial resolution, individual regions on which the technical installation 14 is positioned can remain unevaluated.

In the exemplary embodiment according to FIG. 1, the second sensor 12 likewise comprises an active sensor surface 44 and an evaluation unit 46 which is connected to an input module 28 of the safety system 26 via a line 32. The active sensor area 44 of the second sensor 12 is arranged on a surface of the technical installation 14, here in particular on the robot arm 22. The active sensor surface 44 is flexible and matches the contour of the surface of the technical installation 14. As in the case of the safety mat, a plurality of active sensor areas 44 may be combined to form a composite in this exemplary embodiment, in order to increase the size of the effective operating area. Preferably, the part of the robot which is moving in space is completely covered by the active sensor surface 44.

In the exemplary embodiment according to FIG. 1, the robot arm 22 has two cylindrical components, the active sensor surface 44 being arranged on the cylindrical surface of the said cylindrical components. In contrast to the first sensor 10, the second sensor 12 is designed not to monitor access to the technical installation 14 but rather to detect an object or a person getting in contact with the robot arm 22. As in the case of the first sensor 10, the evaluation unit 46 of the second sensor generates an output signal, based on which the safety system 26 is able to control, in particular switch off, the robot 16. The technical design of the first and the second sensor 10, 12 will be explained in greater detail with reference to the following figures. Identical reference symbols denote identical parts.

Figure 2:
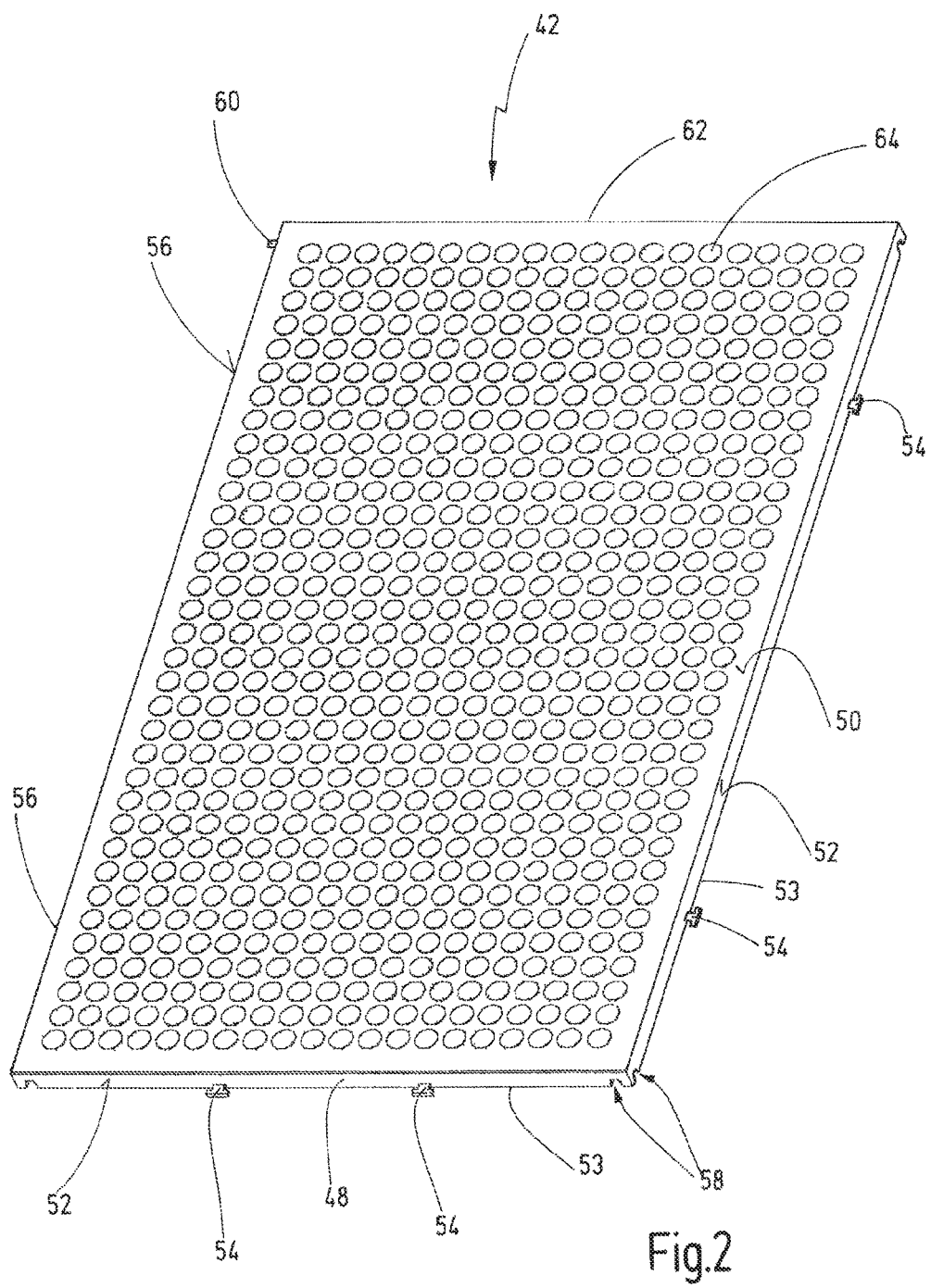
FIG. 2 is a perspective illustration of an exemplary embodiment of a novel safety mat.

FIG. 2 is a perspective illustration of an exemplary embodiment of a safety mat module 42 of the first pressure-sensitive safety device 10 shown in FIG. 1. The safety mat module 42 has a rigid supporting body 48 with a planar surface 50 of large surface area and narrow side faces 52 perpendicular to the surface 50. In the exemplary embodiment according to FIG. 2, the planar surface 50 is rectangular and the safety mat module 42 is cuboidal overall, so that the surface 50, the rear side and the side faces 52 are arranged orthogonally to one another. It goes without saying that in other exemplary embodiments other forms are feasible. In particular, a triangular, diamond-shaped or hexagonal form of the surface are conceivable, that is to say in particular forms with which a surface can be filled without gaps (parqueted).

In the exemplary embodiment according to FIG. 2, the safety mat module 42 is 60 cm wide and 1 m deep and 3 cm high. The surface 50 preferably has an area of between 0.25 m$^2$ and 1 m$^2$. These dimensions are particularly suitable for laying the safety mat modules 42 like normal tiles. In the present exemplary embodiment, T-shaped connecting elements 54 are arranged on the bottom of two side edges 53 of the safety mat module, which protrude perpendicularly from the safety mat module 42. On the side edges which are situated opposite the two side edges 53 receptacles 56 which are situated opposite of the connecting elements 54 are arranged. The receptacles 56 are T-shaped cavities on the rear side of the supporting body 48 corresponding to the connecting elements 54, so that two adjacent safety mat modules 42 can lie flush against one another and can be fixed by the receptacles 56 and the connecting elements 54 engaging one in the other. It goes without saying that in other exemplary embodiments other connecting means are conceivable. For example, in one exemplary embodiment, the connecting elements can be separate components with a double-T-shaped contour which are inserted into the receptacles 56 as required. In another exemplary embodiment, U profiles, for example composed of aluminium, can also be used for holding the safety mat modules together.

In the exemplary embodiment according to FIG. 2, further cavities are arranged in the side faces 52, wherein in at least one of these cavities 58 a plug connector 60 for making electrical contact with an adjacent safety mat module 42 is arranged. A plug (not illustrated here) which fits the plug connector 60 can be arranged in a further cavity 58. An evaluation unit of the safety mat module 42 is arranged within the supporting body 48 (likewise not visible here). The evaluation unit can be connected to a safety system or else to a further evaluation unit of an adjacent safety mat module 42 by the plug and plug connector 60. In one exemplary embodiment, each switching mat requires a termination plug. Preferably, the plug connector 60 can be arranged in different cavities 58, wherein cavities 58 are preferably provided in all of the corner regions of the safety mat module 42. Thereby, the safety mat can be combined to an assembly in a particularly simple and flexible manner.

In the present exemplary embodiment, the planar surface 50 is completely covered by an elastic rubber mat 62, for example a mat which is composed of polyurethane, so that the sensor which is situated beneath said mat is hidden. The rubber mat 62 is preferably fixed on the planar surface 50 and on the transitions of the side faces 52 such that water, dust and other impurities cannot enter the interior of the supporting body 48. The rubber mat 62 and the supporting body 48 are particularly preferably configured such that the safety mat module 42 complies with international protection class IP67. The same applies for the plug and the plug connector 60. The active sensor area and also the evaluation unit of the safety mat are arranged beneath the rubber mat 62, which has here nubs 64 on its surface, in order to minimize the risk of slipping. The pressure-sensitive active sensor area extends beneath the rubber mat 62 over the entire planar surface 50 of the base of the supporting body 48 and defines the active region of the safety mat module 42. In one exemplary embodiment, the active region extends over the entire planar surface 50 of the supporting body 48. It goes without saying that an individual safety mat module 42 can be used as an independent safety mat, without being part of an assembly.

Figure 3:
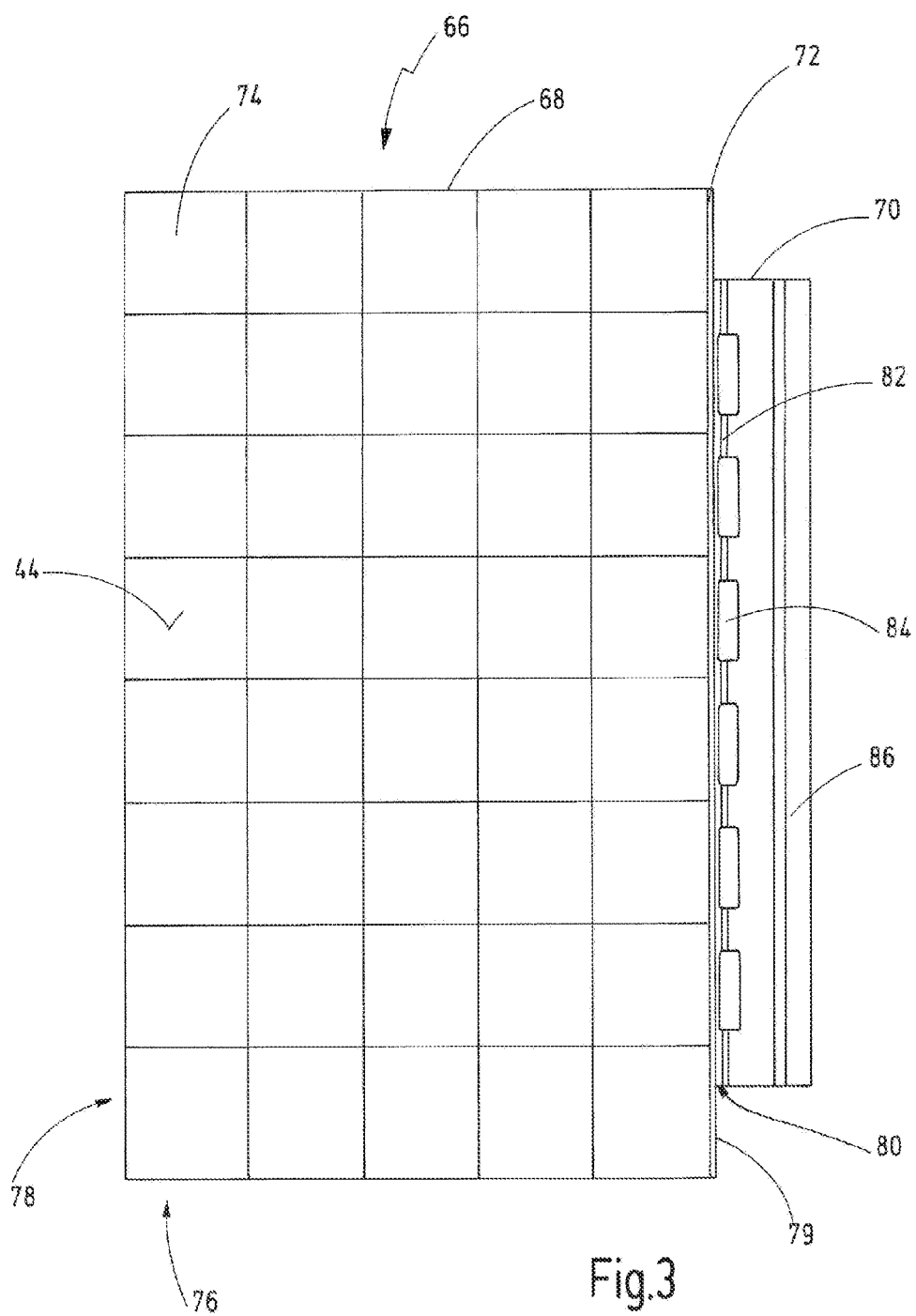
FIG. 3 shows an exemplary embodiment of a sensor of the novel safety mat.

FIG. 3 shows a preferred exemplary embodiment of a sensor 66 for a safety mat module 42. In addition to a matrix-like sensor arrangement 68 which forms the active sensor area 44, the sensor 66 has a connection region 70 for connecting the sensor arrangement 68 to an evaluation unit. The sensor arrangement 68 and the connection region 70 of the sensor 66 are manufactured from a common carrier material 72. The carrier material 72 is preferably a flexible, textile-like woven fabric into which electrical structures are woven. The electrical structures in the fabric are created by the use of conductive and non-conductive yarn. The carrier material 72 is so flexible that it can be rolled up and folded like any fabric. In addition to the carrier material 72, the sensor arrangement 68 has a further fabric-like material which substantially determines the pressure-sensitive properties of the sensor arrangement 68.

The sensor arrangement 68 is formed from the carrier material 72, the electrical structures on the carrier material 72 and the pressure-sensitive material. The electrical structures form individual sensor cells 74 which are arranged in rows 76 and columns 78 in a matrix-like manner. The mechanical load can be determined for each sensor cell 74, in order to determine an overall pressure distribution over the sensor arrangement 68 and therefore over the active sensor area 44, as will be explained in even greater detail with reference to FIG. 4.

In this exemplary embodiment, the connection region 70 is formed on a side edge 79 of the sensor arrangement 68. In other exemplary embodiments, the connection region 70 can also be formed on a plurality of side edges of the sensor arrangement 68. The connection region 70 is an extension of the carrier material 72 and the electrical structures thereon. In other words, the sensor arrangements 68 and the connection region 70 are manufactured substantially from one piece. The connection region 70 is likewise of flexible design. The connection region 70 can be folded along a kink edge 80 which runs along the side edge 79 of the sensor arrangement 68 at the transition to the connection region 70. The connection region 70 is configured to be placed around the kink edge 80, that is to say the connection region 70 can be folded under the sensor arrangement 68 around the kink edge 18. In FIG. 3 the unfolded sensor is shown.

The connection region 70 can extend over the entire length of a side edge 79 of the sensor arrangement 68 or, as in the exemplary embodiment according to FIG. 3, only over a subregion of the side edge 79. The connection region 70 has cavities 84 in a fold-over region 82 which starts from the side edge 79. The fold-over region 82 extends from the kink edge 80, over the entire length of said kink edge, preferably 1 to 2 cm into the connection region 70. The cavities 84 are passage openings in the connection region 70 and are arranged on a straight line parallel to the kink edge 80. The cavities 84 are preferably rectangular, slot-like cavities in the carrier material 72 which are arranged in the fold-over region 82.

The connection region 70 further has a contact-making region 86. Contact can be made with the electrical structures in the contact-making region 86 in order to be able to establish an electrical connection to an evaluation unit. Preferably, insulated cables are woven into the carrier material 72 in the contact-making region 86, wherein the insulation of the cables has been removed at those points at which contact is intended to be made with the electrical structures. This can be performed, for example, by subsequently removing the insulations of the cables at precise points with a laser. The sensor arrangement 68 and the electrical connection thereof are explained in greater detail in FIG. 4.

Figure 4:
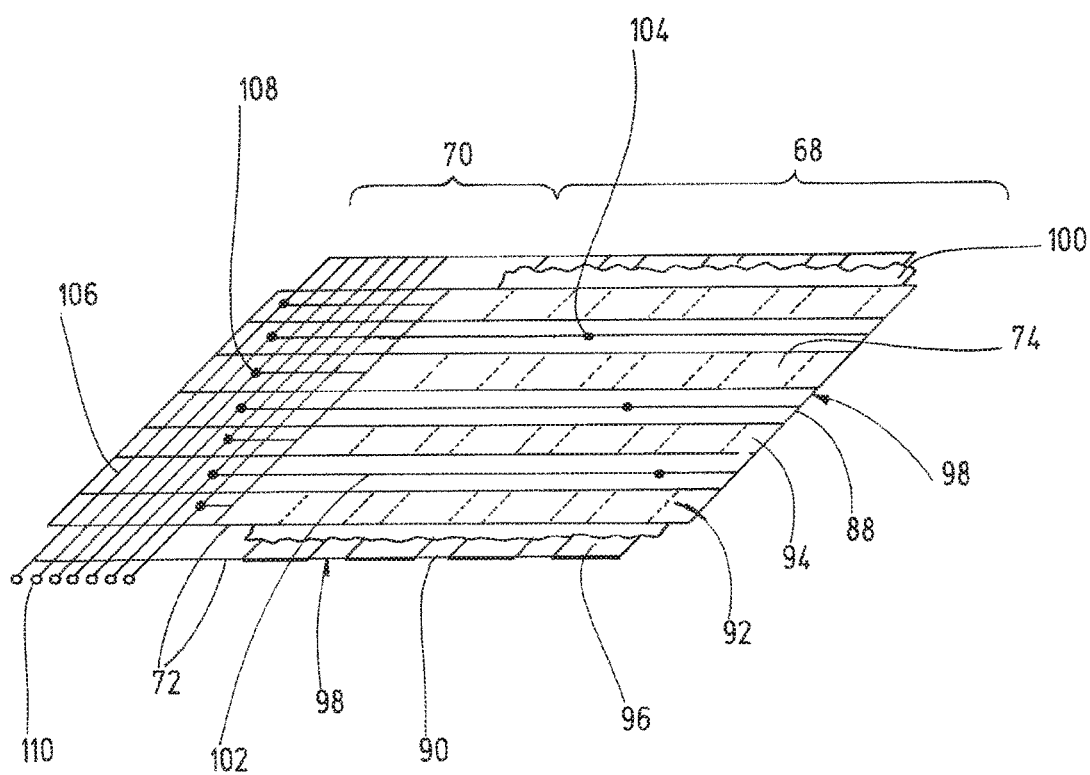
FIG. 4 is a schematic illustration of a further exemplary embodiment of a sensor.

FIG. 4 is a schematic illustration of an exemplary embodiment of a sensor arrangement 68 and also the electrical connection thereof in a connection region 70. The sensor arrangement 68 has a first layer 88 and a second layer 90, which are each manufactured from the carrier material 72. Electrical structures, as described above, are arranged on the first layer 88 and the second layer 90. The electrical structures of the first and the second layer 88, 90 are formed from strip-like electrodes 92, 94, 96. The electrodes of the respective layer are arranged parallel to one another and are spaced apart by insulating intermediate regions 98. The first layer 88 and the second layer 90 are preferably manufactured from one piece which is divided into two parts after manufacture, wherein the two parts are placed above one other and rotated by 90° in relation to one another to form the matrix-like sensor arrangement 68.

A further layer 100 which is composed of pressure-sensitive material is arranged between the first layer 88 and the second layer 90. The further layer 100 is preferably composed of a non-woven, conductive fabric. Particularly preferably, the further layer 100 is a non-woven microfibre cloth which is coated with a conductive coating. The pressure-sensitive material of the further layer 100 is configured such that, when it is mechanically loaded, it changes the electrical properties between two opposite electrodes.

The sensor cells 74 of the sensor arrangement 68 are formed in the overlap regions (illustrated using dashed lines here) of the electrodes 92, 94 of the first layer 88 and the electrodes 96 of the second layer 90. It goes without saying that the other electrodes of the first and the second layer form further sensor cells 74. Therefore, contact can be made with each sensor cell 74 by an electrode of the first layer 88 and an electrode of the second layer 90. The pressure-sensitive material of the further layer 100, which pressure-sensitive material determines the electrical properties of the sensor cell 74 when it is mechanically loaded, is arranged between the electrodes of a sensor cell 74. The electrical property of a sensor cell 74 is preferably determined by the specific electrical resistance of the sensor cell 74 which can be measured using the electrodes of the sensor cell 74. A change in the specific electrical resistance due to a mechanical load on the sensor cell 74 can arise in various ways. For example, in one exemplary embodiment, when the further layer is mechanically loaded, the specific electrical resistance of the said further layer changes at the site of the loading. In another preferred exemplary embodiment, the change in resistance due to a load is caused by a change in the contact area from the electrodes of the first and the second layer 88, 90 to the conductive material of the further layer 100. That is, the first and the second layer with the electrodes 92, 94, 96 adapt under pressure to the rough, conductive material of the further layer 100 and as a result of which the size of the contact area is increased and the resistance falls. Alternatively, a change in resistance is caused by a change in geometry of the conductive material of the further layer 100 as a result of mechanical loading.

In a further exemplary embodiment, the pressure-sensitive material is an electrically non-conductive flexible material which is in the form of a sieve and deforms under mechanical loading, so that the first and the second electrode of the first layer can partially get in contact with the third electrode in the second layer in the region of the mechanical loading. The electrical resistance of a sensor cell is then dependent on the elasticity, the size and the shape of the sieve-like grid. The electrical resistance of a sensor cell is then determined by the number of times the electrodes which are spaced apart by the pressure-sensitive material make contact. The greater the number of contact points resulting from the mechanical loading of the pressure-sensitive material in the region of a sensor cell, the lower the electrical resistance of the sensor cell.

Preferably, the electrodes 92, 94 of the first layer 88 and the electrodes 96 of the second layer 90 are contacted on one side of the sensor arrangement 68. As described above, contact is made in a connection region 70 which is formed from an extension of the carrier material 72 of the first and/or of the second layer. In the exemplary embodiment according to FIG. 4, both the carrier material 72 of the first layer 88 and the second layer 90 are extended into the connection region 70. However, only the electrodes of the first layer 88 are extended into the connection region 70 here as well as further conductive paths 102 which are arranged parallel to the electrodes in the intermediate regions 98 of the first layer 88. The conductive paths 102 are woven into the carrier material 72, like the electrodes 92, 94. The conductive paths 102 can extend over the entire width of the first layer 88, like the electrodes 92, 94. Furthermore, the sensor arrangement 68 has through connections 104 which electrically connect the further conductive paths 102 to the electrodes 96 of the second layer 90. Like the electrodes, the through connections 104 are composed of conductive yarn, but are routed orthogonally to the first and the second layer from the first layer 88, through the further layer 100, to the second layer 90.

Insulated cables 106 which run perpendicular to the electrodes 92, 94 of the first layer 88 and the further conductive paths 102 are arranged in the connection region 70. The insulation of the cables 106 is removed at individual contact points 108, so that an electrical connection can be made between the electrodes 92, 94 of the first layer or one of the further conductive paths 102 and the insulated cables 106 at these points. The insulated cables 106 are routed out of the carrier material 72 on one side of the connection region 70 and provided with connections 110, for example in the form of a connector strip. The insulated cables 106 and therefore the electrodes 92, 94, 96 of the first and the second layer 88, 90 can be connected to an evaluation unit (not illustrated here), which can determine by the connections 110 the resistances within the sensor cells 74.

Figure 5:
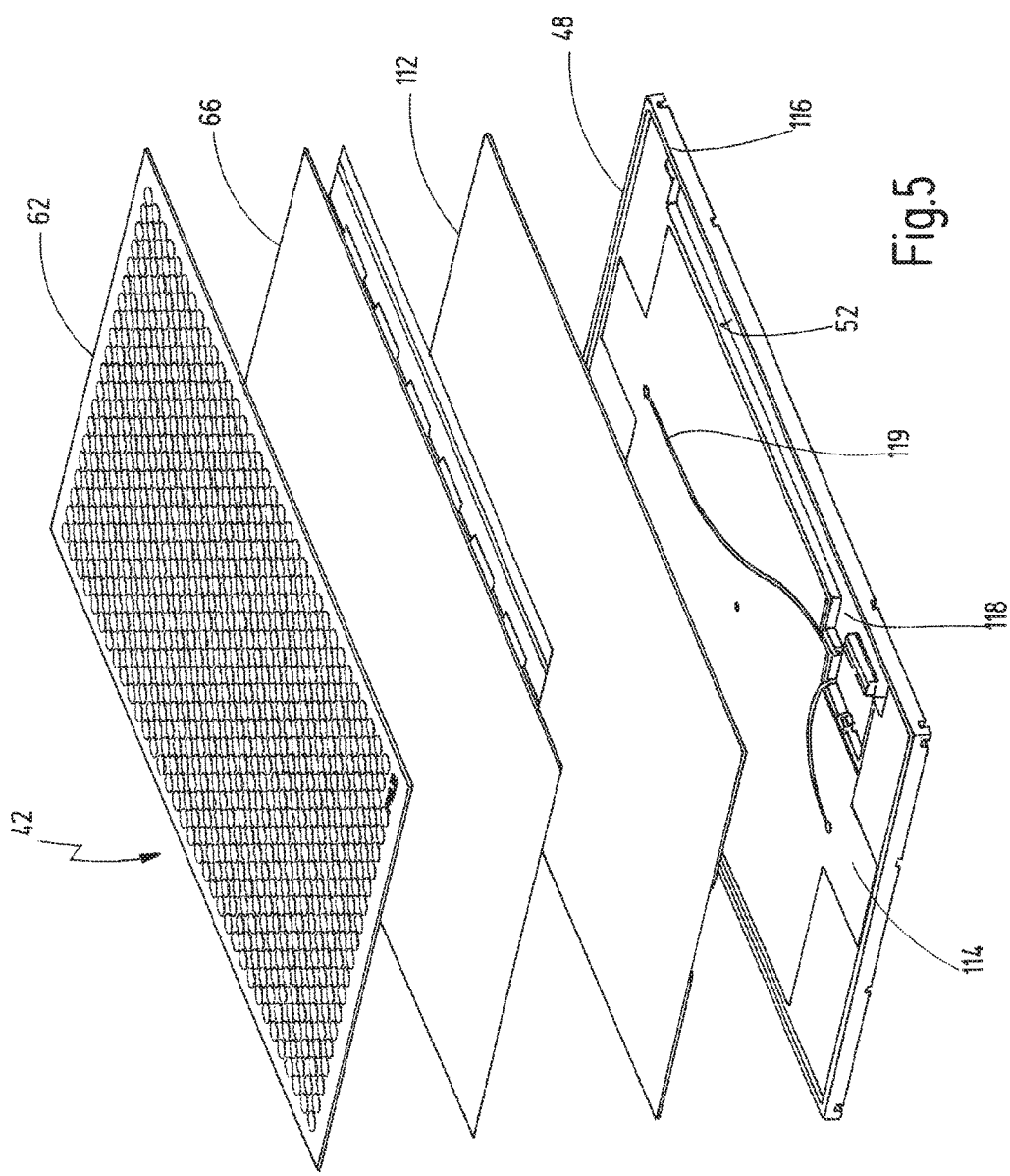
FIG. 5 is an exploded assembly drawing of an exemplary embodiment of a novel safety mat.
Figure 6:
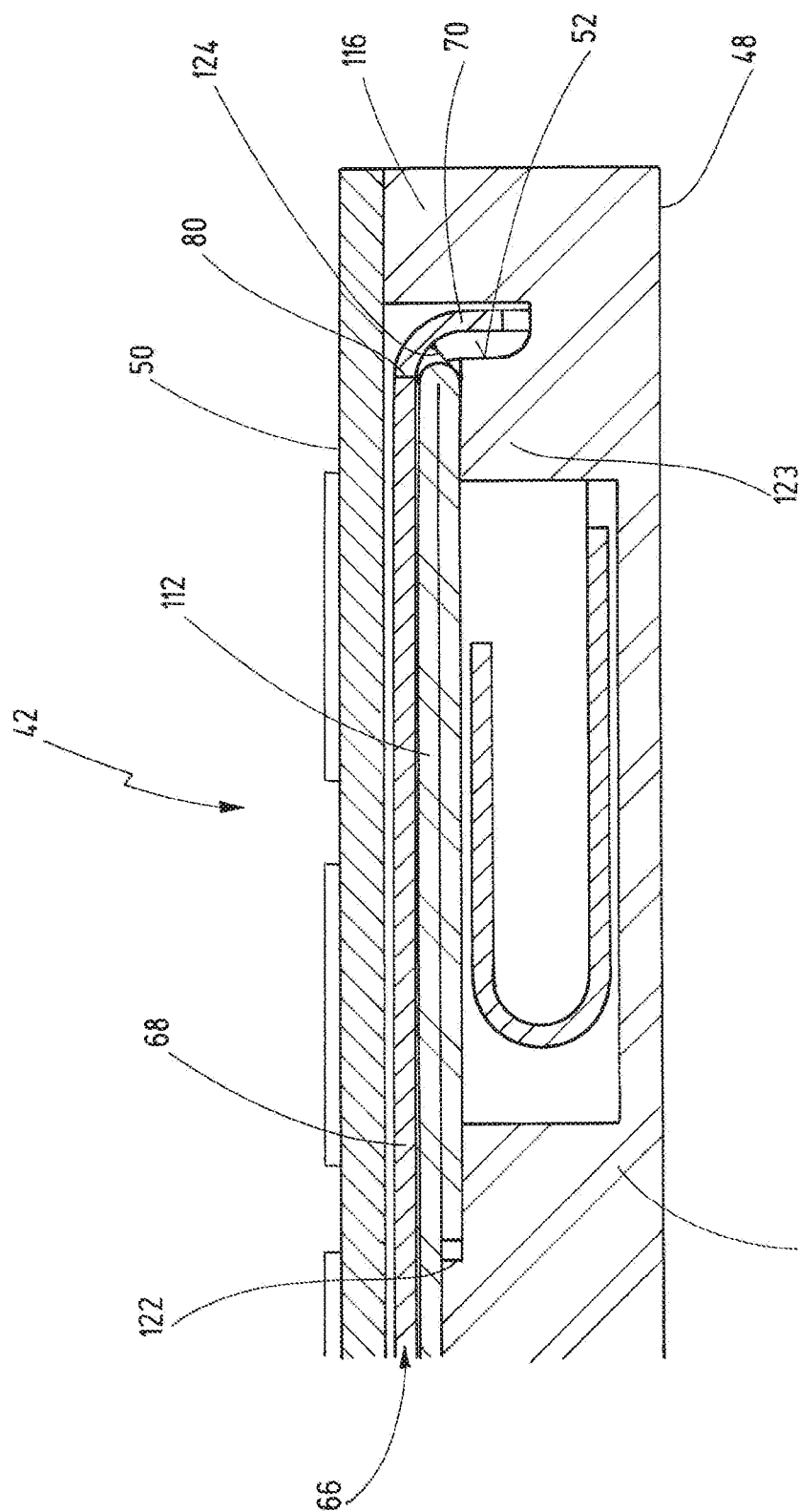
FIG. 6 shows a sectional drawing of an exemplary embodiment of a novel safety mat.

FIGS. 5 and 6 show a preferred exemplary embodiment of a safety mat module 42 in an exploded assembly drawing and in a sectional drawing. Once again, identical reference numbers denote identical parts.

FIG. 5 shows the layered composition of the safety mat module 42. The first level forms the slip-resistant rubber mat 62 beneath which the sensor 66 is arranged. The sensor lies on a cover plate 112 which is configured to be inserted into the supporting body 48. The cover plate 112 is dimensioned such that it is completely covered by the sensor arrangement 68 of the sensor 66, while the connection region 70 of the sensor 66 protrudes beyond the cover plate 112. The connection region 70 likewise protrudes beyond the rubber mat 62. Therefore, in an assembled state, the rubber mat 62, the cover plate 112 and the sensor arrangement 68 form a layered assembly, from which the connection region 70 protrudes.

In this preferred exemplary embodiment, the supporting body 48 has a base 114 with a circumferential, protruding border 116. The cover plate 112 and the sensor arrangement 68 lie on the supporting body. The cover plate 112 is fixed on the supporting body 48 in a force-fitting or cohesive manner by a plurality of adhesion points having a diameter and depth as bores in the supporting body selected such that on the one hand different thermal expansion characteristics can be compensated for and on the other hand the tensile forces of the adhesive layer do not lead to a deforming of the safety mat due to a change in temperature. In another exemplary embodiment, the cover plate 112 can also be fixed to the border 116 by an interlocking connection. Furthermore, the cover plate 112 can have one or more press-in bolts and the supporting body 48 can have corresponding bores in order to orient the cover plate 112 with respect to the supporting body 48.

The rubber mat 62 extends beyond the cover plate 112 and the sensor arrangement 68 to such an extent that the top side of the border 116 is also covered by the rubber mat 62. Thereby, the cover plate 112 and the sensor arrangement 68 are embedded, preferably in a water- and dust-tight manner, within the supporting body 48 by the rubber mat 62 being adhesively bonded to the top side of the border 116. Structures 118 in form of cavities are incorporated into the base 114, in which the electronics of the safety mat module 42, for example the evaluation unit, are being arranged. The structures 118 can furthermore have cavities for cable harness 119 in order to connect the electronics to the outside.

FIG. 6 depicts a cross section of the safety mat module 42 across the kink edge 80 of the sensor 66. The sensor arrangement 68 lies on top of a cover plate 112 which, in turn, lies on top of the supporting body 48. The cover plate 112 can be a rigid metal plate which, in this exemplary embodiment, is folded at a one side by 180° and the folded section engages into a fold in the supporting body 48 in an interlocking manner in order to fix the metal plate on the supporting body. The connection region 70 is folded over a side face 52, which is perpendicular to the surface 50, in a radius 124. The radius 124 is preferably between 0.2 cm and 1 cm. During the folding, a protrusion 123 of the supporting body 48 which supports the cover plate 112 is guided through the cavity 84 in the connection region. Thereby, a force which is applied perpendicularly to the surface 50 does not affect the connection region 70, but is rather released past the connection region 70 through the protrusion 123 onto the supporting body 48. Therefore, the connection region 70 is not subjected to loading when a person steps onto the surface.

In the preferred exemplary embodiment according to FIG. 6, the supporting body 48 additionally comprises a border 116 around the supporting body. The slip-resistant rubber mat 62 is placed onto the border 116, so that the interior of the supporting body 48 is sealed. In another exemplary embodiment, the sensor arrangement 68 and the cover plate 112 may extend over the border, so that the connection region 70 is folded over the border 116 and guided into the interior of the supporting body 48. In this case, the border 116 has a groove-like profile into which the cavities 84 of the connection region 70 can engage, so that a force which applied onto the surface 50 is also released past the connection region 70.

Figure 7:
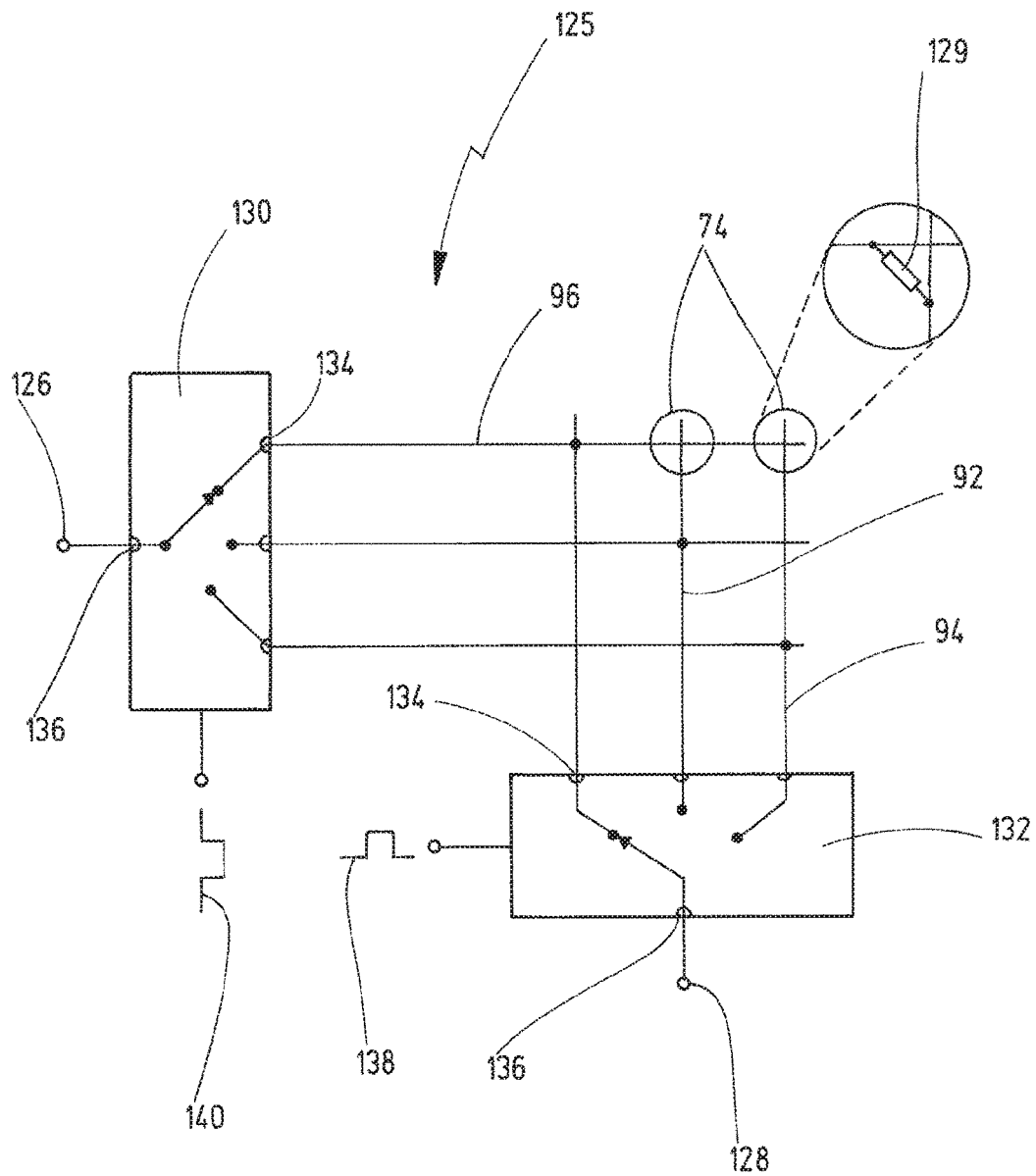
FIG. 7 is a schematic illustration of an exemplary embodiment of a connection circuit of a sensor.
Figure 8:
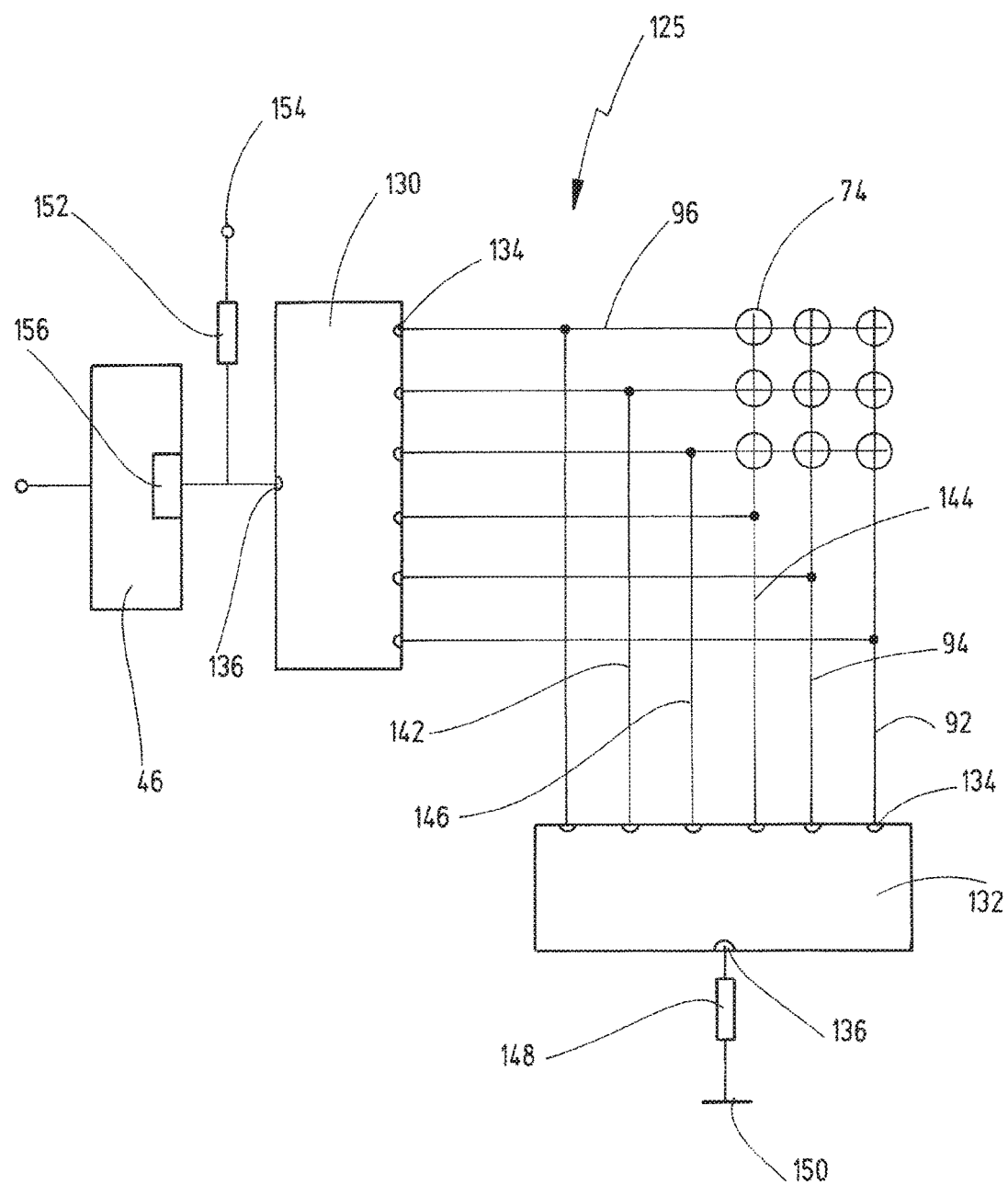
FIG. 8 is a schematic illustration of a preferred exemplary embodiment of a connection circuit of a sensor.

FIGS. 7 and 8 show two schematic illustrations of exemplary embodiments for contacting the sensor 66.

FIG. 7 shows a first and a second sensor cell 74 that can be connected to an evaluation unit (not illustrated here) by a circuit arrangement 125 having a first and a second terminal 126, 128. The sensor cells 74 are formed from a first electrode 92, a second electrode 94 and a third electrode 96. Between the electrodes of a sensor cell 74 a resistance 129 can be determined which, as explained above, is dependent on the mechanical load applied to the sensor cell 74.

The electrodes 92, 94, 96 are connected to a first sequentialization element 130 and a second sequentialization element 132. The first and the second sequentialization element 130, 132 are configured to combine a large number of connection terminals to a single connection terminal 126, 128. The sequentialization elements 130, 132 are preferably data switches, so-called multiplexers. A sequentialization element 130, 132 has a large number of inputs 134 and a single output 136. In a sequentialization element 130, 132, one output 136 is always connected to one of the inputs 134 at a specific time. A sequentialization element 130, 132 can be single, preferably integrated electronic device, or a combination of multiple individual switching device which are coupled together in order to form a single sequentialization element. Switching between the individual inputs 134 of the sequentialization elements 130, 132 is performed by an external trigger 138, 140. The external trigger 138, 140 can be provided directly by the evaluation unit or can be provided by an external clock signal. In the latter case, the cycle of the external trigger 138 of the second sequentialization element 132 is preferably one factor greater than the cycle of the external trigger 140 of the first sequentialization element 130. The ratio is selected such that the first sequentialization element 130 connects a first input of the inputs 134 to the output 136, while the second sequentialization element during the same time connects all of its inputs 134 at least once to the output 136. This way, all of the sensor cells 74 can be tested in succession in a simple manner by the respective electrodes being connected to the outputs 136 of the first and the second sequentialization element 130, 132 by the said sequentialization elements.

The first and the second sequentialization element 130, 132 are over-occupied at their inputs 134, i.e. the first sequentialization element 130 is connected not only to the electrodes 92, 94 of the first layer 88 but also to the electrodes 96 of the second layer 90. The second sequentialization element 132 is connected not only to the electrodes 96 of the second layer 90 but also to the electrodes 92, 94 of the first layer 90. As illustrated in FIG. 7, the outputs 136 can be connected to the same electrode (here the third electrode 96). In such a constellation of the first and the second sequentialization element 130, 132, the sensor cells 74 can be "bridged". Therefore a direct connection between the outputs 136 of the first sequentialization element 130 and the second sequentialization element 132 can be established.

Such a "short circuit" can be determined by measurement by an evaluation unit which is connected to the first and the second terminal 126, 128. If the first and the second sequentialization element 130, 132 are correctly connected, the evaluation unit can determine the corresponding short circuit between the first terminal 126 and the second terminal 128. In order to self-test the sequentialization elements 130, 132, the sequentialization elements are short-circuited at intervals and the short circuit is tested by the evaluation unit. Thereby, the functionality of the sequentialization elements 130, 132 as part of the signal-processing chain of the sensor can be continuously verified.

FIG. 8 shows a particularly preferred exemplary embodiment for contacting the matrix-like sensor 66. In the exemplary embodiment according to FIG. 8, nine sensor cells 74 are connected to an evaluation unit 46 by a first sequentialization element 130 and a second sequentialization element 132. In addition to the first, second and third electrodes 92, 94, 96, the circuit arrangement 125 has three further electrodes 142, 144, 146 which contact the further sensor cells 74. As in the exemplary embodiment above, all of the electrodes 92, 94, 96, 142, 144, 146 are each connected to the inputs 134 of the first and the second sequentialization element 130, 132. This way, not only each of the two electrodes of a sensor cell 74 can be connected to the outputs 136, but also a direct connection in the abovementioned manner can produced.

In the exemplary embodiment according to FIG. 8, the output 136 of the second sequentialization element 132 is connected to an electrical ground terminal 150 by a first resistor 148. The output 136 of the first sequentialization element 130 is on the one hand connected to a voltage source 154 by a second resistor 152 and on the other hand the output 136 of the first sequentialization element 130 is connected to an analog/digital converter (ADC) 156 of the evaluation unit 46. Thereby a voltage divider is being formed between the second resistor 152 and the first resistor 148 or between the second resistor 152 and the sum of the second resistor 152 and the resistor 129 of the sensor cells 74 to which the first and the second sequentialization element 130, 132 are connected. In other words, when the first sequentialization element 130 and the second sequentialization element 132 are "short-circuited", a defined voltage is established at the analog/digital converter 156, the said defined voltage being produced by the voltage divider of the first and the second resistor 148, 152 and the voltage of the voltage source 154. Secondly, the specific resistance 129 of a sensor cell 74 can easily be determined from the deviation from this expected value.

In this way, it is particularly easy to determine by the evaluation unit 46 the instantaneous resistance of a sensor cell 74 and therefore the corresponding pressure load on a sensor cell 74. Furthermore, the addressing of the sequentialization elements 130, 132 can be tested in a simple manner. Additional devices for monitoring the sequentialization elements 130, 132 are not required.

Furthermore, the analog/digital converter 156 may be tested for correct operation if the first resistor 148 and the second resistor 152 are each adjustable. Owing to the variable voltage divider which is present when the first and the second sequentialization element 130, 132 are connected to the same electrode, the entire region of the analog/digital converter 156 can be made verifiable. The results of the evaluation of the sensor cells 74 and also the results of the monitoring of the sequentialization elements and/or of the analog/digital converter 156 can be transferred to a superordinate control unit for further processing.

In one exemplary embodiment, the evaluation unit 46 can be an OSSD, that is the output signal is an OSSD signal which can indicate a first state and a second state. Preferably, the signal is a redundant clock signal with two components which are not synchronized with one another. The first state indicates a safe state of the sensor, i.e. a state in which a sensor cell 74 is not subjected to a load and no fault has been identified in either of the sequentialization elements 130, 132 or the analog/digital converter 156. The first state is actively signalled, that is to say the redundant signal has to be present in this state. The second state is signalled by there being no redundant clock signal and indicates that either a sensor cell 74 has been subjected to loading or there is a fault in the sequentialization elements 130, 132 or the analog/digital converter 156.

In another exemplary embodiment, the output signal from the evaluation unit 46 contains an encoded signal which contains information about which sensor cell 74 is subjected to loading or which sensor cell 74 is not subjected to loading. Similarly, the results of the self-test of the sequentialization elements 130, 132 and of the analog/digital converter 156 can be transmitted to a safety system, so that on the on hand an evaluation if the sensor 66 has been touched can be performed and on the other hand a diagnosis report which indicates the functionality of the sensor 66 and the signal processing thereof can be generated.

There are also intermediate configurations between the last two exemplary embodiments conceivable, for example an OSSD signal that is being provided by the evaluation unit and diagnosis data that is being provided by a second output at the same time. It goes without saying that the exemplary embodiment according to FIG. 8 can be extended to any desired number of sensor cells 74 and the disclosure is not limited to the nine sensor cells shown.

Figure 9:
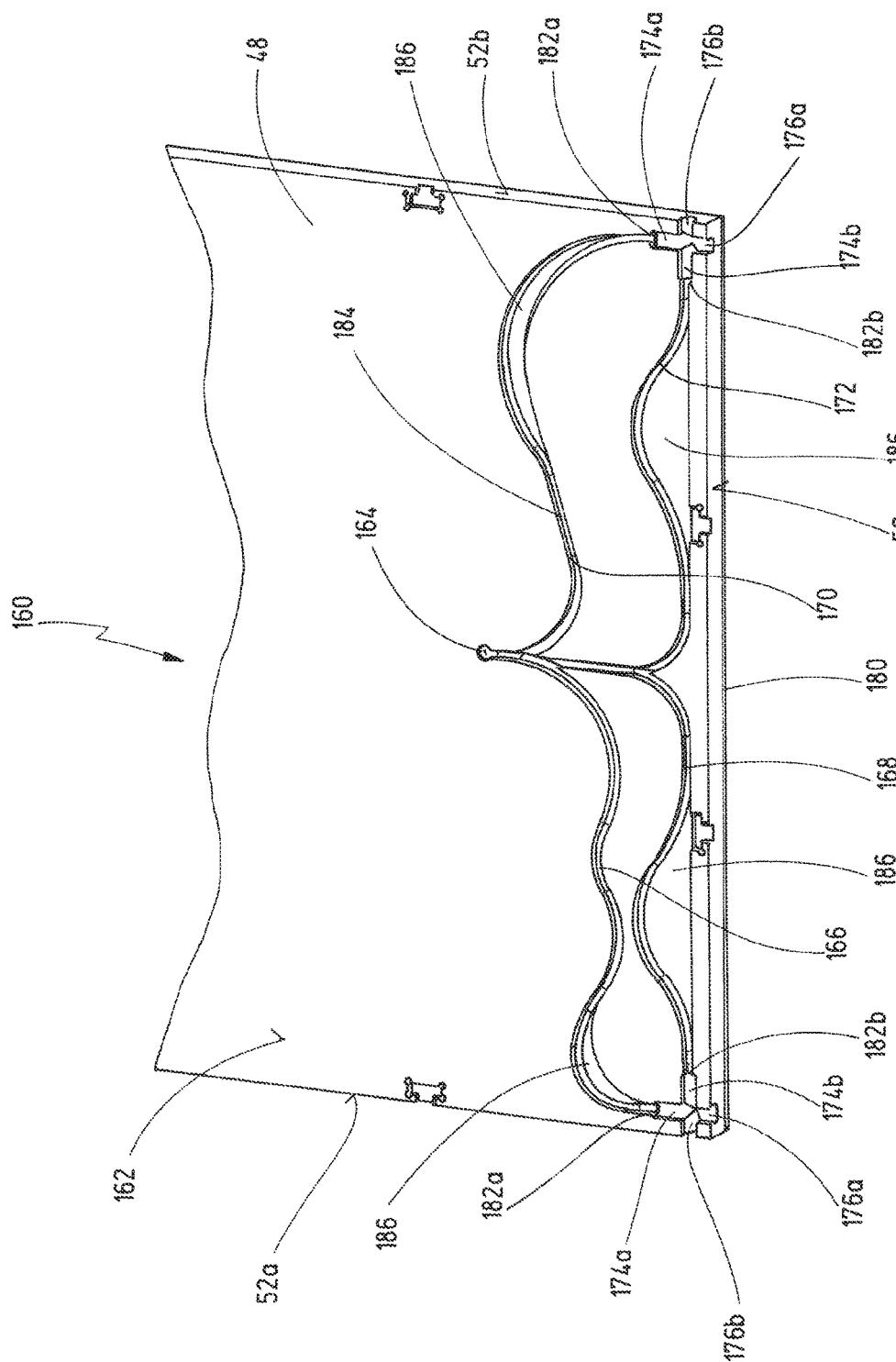
FIG. 9 is a perspective illustration of a preferred exemplary embodiment of a rear side of a novel safety mat.

FIG. 9 is a perspective illustration of the rear side of a preferred exemplary embodiment of the novel safety mat. The rear side 160 of the safety mat corresponds to the bottom side of the supporting body 48. The rear side 160 substantially has a planar surface 162 into which structures are incorporated in order to enable the connection of the electronics which are situated inside the supporting body 48. The structures are incorporated into the planar surface 162, for example, by a surface milling process, or are formed directly during production of the supporting body 48, for example during injection-moulding.

In the exemplary embodiment according to FIG. 9, the structures have a passage opening 164, a first, second, third and fourth cable guide 166, 168, 170, 172 and also sockets 174a, 174b in the form of hollows in the rear side 160. The passage opening 164 is an opening which is perpendicular to the planar surface 162, preferably in the form of a bore, which extends through the supporting body 48. A connection to electronics, such as the evaluation unit of the safety mat for example, which are arranged within the supporting body 48 can be established through the passage opening 164. In a preferred exemplary embodiment, a cable, not illustrated here, is guided through the passage opening 164. The cable is preferably a multicore cable with a protective sheathing. As an alternative, it is also feasible to use a prefabricated cable harness.

The cable is preferably fixed in the passage opening 164 and the passage opening 164 is otherwise sealed in a dust- and water-tight manner by a seal or filling, so that a high International Protection Marking, for example in line with IP67, can be ensured. Owing to the fixing, that part of the cable which exits from the supporting body 48 out of the passage opening 164 has a defined, fixed length, and a plug connector is arranged at the end of the said cable. The plug connector is preferably a multipole round plug connector of type M5, M8 or M12. In a preferred exemplary embodiment, the plug connector has a screw-locking arrangement in line with DIN EN 61076-2-104 or a snap-locking arrangement. The plug connector can have an IP65/IP67 protection marking, for example by the plug connector being moulded on the cable. The plug connector is particularly preferably arranged in a metal housing which has 360° EMC-proof shielding in order to ensure a high degree of reliability for signal transmission.

The sockets 174a, 174b form receptacles for the plug connector. The shape of a socket 174a, 174b is matched to the shape of a plug connector. A socket 174a, 174b is preferably an elongate hollow with a semicircular cross section into which a round plug connector can be clipped, so that the plug connector is held in the hollow. The sockets 174a, 174b open on one side into a cavity 176a, 176b in the side faces 52a, 52b and merge on the opposite side with one of the cable guides 166, 168, 170, 172. In each case two sockets 174a, 174b are particularly preferably arranged in the manner of a cross in relation to one another in a corner region in which the first and the second side faces 52a, 52b meet. The distances by which the cavities 176a, 176b of the two sockets 174a, 174b are remote from the abutment edge 178 of the two side faces 52a, 52b are preferably the same, so that the cavities 176a, 176b of two adjacent safety mats are located opposite one another when the safety mats abut flush one against the other. In a preferred exemplary embodiment with a cuboidal supporting body, intersecting sockets are arranged in all four corners with cavities in each case at a fixed distance from the side edges of the cuboidal supporting body. This way, the safety mats can be combined with one another in a particularly flexible manner and joined to form a multi component assembly.

The sockets 174a, 174b are connected to the passage opening 164 by cable guides 166, 168, 170, 172. In the exemplary embodiment according to FIG. 9, the passage opening 164 is arranged centrally with respect to an end side 180 of the safety mat. Here, two sockets 174a are arranged with a first orientation in which the cavities 176a of the sockets 174a lie in the side faces 52a, wherein two further sockets 174b are arranged with a second orientation, so that the cavities 176b of the said further sockets lie in the side faces 52b. The first and the second orientation are preferably at an angle of 90° in relation to one another when the supporting body 48 is rectangular. The transitions 182a, 182b from the sockets 174a, 174b to the cable guides 166, 168, 170, 174 are arranged at a first and a second distance from the passage opening 164, wherein the first distance and the second distance are different. An edge is formed at the transitions 182a, 182b, so that a plug connector which is inserted into the sockets 174a, 174b cannot slide into the cable guides.

A cable which emerges from the passage opening 164 can be inserted into the cable guides 166, 168, 170, 172. The cable guides 166, 168, 170, 172 form channels in the planar surface 162 which run from the passage opening 164 to the transitions 182a, 182b. The channel walls are rounded, wherein the rounded portion is designed such that a surface of the cable bears at least partially flush against the channel walls. The depth of the channels is designed such that a cable can be completely inserted into the channels and therefore does not protrude from the planar surface 162. The channels preferably have a barrel-like profile in cross section. In another exemplary embodiment, the profile is U-shaped, wherein the lower corners are rounded.

In one exemplary embodiment, the channels have a length which corresponds to the defined length of the cable which emerges from the passage opening 164. The channels of the individual cable guides 166, 168, 170, 172 are preferably of equal length. The profile of the cable guides 166, 168, 170, 172 is curved with large radii of curvature and does not have any corners. The profile is free of kinks. The radii are preferably greater than 10 cm. In the exemplary embodiment according to FIG. 9, the curved profile of a cable guide 166, 168, 170, 172 is made up of different sections. The sections can be straight or bent sections. Transition bends are preferably arranged between the sections, which are configured such that a curve in the transition from a straight section to an arcuate section becomes narrower only slowly and not suddenly. The curved profile makes it possible for even stiff cables which exhibit a low degree of flexibility to be uniformly inserted into the cable guides and therefore securely fitted. In particular, the risk of a core snapping or a plurality of cores being squashed such that a cross-connection is formed when the cables are kinked is reduced.

In one exemplary embodiment, the cable is laid in the cable guides 166, 168, 170, 172 without play. In another preferred exemplary embodiment, the channels have at least one first section 184 and one second section 186. A cable can be laid without play in the first section 184. In the second section 186 a compression space is formed by the cable guide widening in this region. The defined width of the cable guides in the first region of the second section 186 preferably uniformly increases and, in an adjoining second section, continuously decreases again down to the defined width of the first section 184. The compression space 186 is designed to lay a cable without play in order to compensate for slight variations in the cable length. The combination of sections with compression spaces 186 and sections 184 with accurately fitting cable guidance allows effective fixing of the cable in the channels, wherein a certain degree of flexibility in respect of the cable length is provided by the compression spaces 184 at the same time.

Flexibility during cable guidance is important when, in one exemplary embodiment, the sockets 174a, 174b have further structures for fixing the plug connectors in different positions. For example, it is conceivable for the plug connector to be able to be arranged within the socket 174a, 174b in a first and a second position, wherein the plug connector terminates flush with the side face 52 in the first position, and the plug connector extends beyond the side face 52 or comes to lie further in the interior of the supporting body 48 and therefore does not terminate flush with the side faces in the second position. The cable to the plug connector has to be longer or shorter in the second position than in the first position. This variation in length can be achieved by the compression spaces 186.

It goes without saying that the design of the rear side is not limited to the exemplary embodiments shown here. In particular, in other exemplary embodiments the passage opening 164 can also be arranged in an eccentric manner. Similarly, further passage openings can be provided with further cable guides and also passage openings can be provided with a plurality of cables in order to provide the further side faces with connection options. In a preferred exemplary embodiment, an output signal from the evaluation unit of the safety mat is supplied via a first passage opening 164 and an input or control signal is received via a further passage opening. Signals can particularly preferably be looped through from one passage opening, via the evaluation unit, to a further passage opening. An assembly of multiple safety mats, which are connected in series, can be formed particularly effectively in this way.

What is claimed is:

1. A safety mat for safeguarding an electrically driven installation comprising a sensor, a rigid supporting body and an evaluation unit,
    wherein the supporting body has a top side, a rear side and a first and a second side face, the first and second side faces adjoining the top side and the rear side,
    wherein the evaluation unit is arranged in the interior of the supporting body and is configured to provide an output signal depending on the actuation of the sensor,
    wherein the sensor has an active surface which covers the top side of the supporting body,
    wherein the rear side has an opening for contacting the evaluation unit in the interior of the supporting body,
    wherein the first side face has a first cavity and the second side face has a second cavity, and
    wherein the rear side has first and second cable guides and the first cable guide connects the opening to the first cavity and the second cable guide connects the opening to the second cavity.

2. The safety mat according to claim 1, wherein the rear side defines a planar level and the first and the second cable guides are recessed in the rear side.

3. The safety mat according to claim 1, wherein the first and second cable guides each comprise a channel-like, elongated recess in the rear side of the supporting body with a defined length and a defined width.

4. The safety mat according to claim 3, wherein the defined length of the first cable guide is equal to the defined length of the second cable guide.

5. The safety mat according to claim 3, wherein the first cable guide has a first section and a second section, and
    wherein the defined width is constant in the first section and the defined width varies over the length of the second section.

6. The safety mat according to claim 3, wherein the channel-like, elongated recesses have in width a barrel-like profile in cross section.

7. The safety mat according to claim 1, wherein the first and the second cable guides are configured such that the first cable guide connects the opening and the first cavity without any kinks and the second cable guide connects the opening and the second cavity without any kinks.

8. The safety mat according to claim 1, wherein the first and second cable guides each have a curved profile with a varying curvature.

9. The safety mat according to claim 1, wherein the first cable guide has a curved profile with at least one straight section and with at least one transition bend.

10. The safety mat according to claim 1, wherein the first cable guide and the second cable guide have at least one common section in the region of the opening.

11. The safety mat according to claim 1, wherein the evaluation unit is contacted by a cable which is fixed in the opening and which exits from the supporting body with a defined cable length.

12. The safety mat according to claim 11, wherein the cable has a plug connector and the rear side has a first hollow and a second hollow as receptacles for the plug connector.

13. The safety mat according to claim 12, wherein the first hollow is arranged at the end of the first cable guide and opens in the first cavity and the second hollow is arranged at the end of the second cable guide and opens in the second cavity.

14. The safety mat according to claim 12, wherein the first hollow and the second hollow intersect at an angle.

15. The safety mat according to claim 14, wherein the first hollow and the second hollow intersect at a right angle.

16. The safety mat according to claim 12, wherein the plug connector has a connection side, and the first hollow and the second hollow are configured such that the plug connector can be inserted into the first hollow in a first position and in a second position, and
    wherein the connection side of the plug connector terminates flush with the first side face in the first position and the connection side of the plug connector is not arranged flush with respect to the first side face in the second position.

* * * * *